(12) United States Patent
Scherer

(10) Patent No.: US 11,448,273 B2
(45) Date of Patent: Sep. 20, 2022

(54) BRAKE CARRIER FOR A DISC BRAKE

(71) Applicant: WABCO Europe BVBA, Brussels (BE)

(72) Inventor: Vitalij Scherer, Leimen (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 16/207,272

(22) Filed: Dec. 3, 2018

(65) Prior Publication Data

US 2019/0178318 A1 Jun. 13, 2019

(30) Foreign Application Priority Data

Dec. 8, 2017 (DE) ...................... 10 2017 011 338.6

(51) Int. Cl.
*F16D 65/00* (2006.01)
*F16D 55/226* (2006.01)
*F16D 55/00* (2006.01)

(52) U.S. Cl.
CPC ....... *F16D 65/0068* (2013.01); *F16D 55/226* (2013.01); *F16D 65/0056* (2013.01); *F16D 55/2262* (2013.01); *F16D 2055/0008* (2013.01); *F16D 2055/0016* (2013.01)

(58) Field of Classification Search
CPC ............ F16D 65/0068; F16D 65/0056; F16D 55/226; F16D 55/2262; F16D 2055/0008; F16D 2055/0016
See application file for complete search history.

(56) References Cited

U.S. PATENT DOCUMENTS

| | | | |
|---|---|---|---|
| 6,186,289 B1 | 2/2001 | Takano et al. | |
| 9,353,810 B2* | 5/2016 | Morais | ................ F16D 55/2262 |
| 2008/0067015 A1* | 3/2008 | Thomas | ................... F16D 55/00 188/73.31 |
| 2009/0071767 A1* | 3/2009 | Bass | ..................... F16D 55/228 188/72.5 |
| 2012/0067678 A1* | 3/2012 | Andrews | ............... F16D 65/095 188/206 A |

(Continued)

FOREIGN PATENT DOCUMENTS

| | | |
|---|---|---|
| DE | 4343737 A1 | 3/1995 |
| DE | 29821643 U1 | 3/1999 |
| DE | 102011103963 B3 | 9/2012 |

(Continued)

OTHER PUBLICATIONS

Machine English Translation of WO-2017060513 A1 (Year: 2017).*

*Primary Examiner* — Melody M Burch
(74) *Attorney, Agent, or Firm* — Dickinson Wright PLLC

(57) ABSTRACT

A brake carrier for receiving brake pads for a disc brake with a brake disc includes a clamping-side bridge strut on a clamping side of the disc brake, and a reaction-side bridge strut on a reaction side of the disc brake arranged parallel to a brake carrier axis. The clamping-side bridge strut and the reaction-side bridge strut are connected together via a first connecting web at a first end of the brake carrier. Also, the clamping-side bridge strut and the reaction-side bridge strut are connected together via a second connecting web at a second end of the brake carrier. The brake carrier has a brake pad receiving side provided with brake carrier horns, and a brake carrier underside.

8 Claims, 13 Drawing Sheets

(56) References Cited

U.S. PATENT DOCUMENTS

2012/0298456 A1* 11/2012 Morris .................. F16D 55/226
                                                                    188/72.4
2016/0208870 A1* 7/2016 Rguichi .............. F16D 65/0068

FOREIGN PATENT DOCUMENTS

| | | | |
|---|---|---|---|
| DE | 102016104967 A1 | 4/2017 | |
| WO | WO-2017060513 A1 * | 4/2017 | ......... F16D 65/0974 |

* cited by examiner

BRAKE CARRIER FOR A DISC BRAKE

TECHNICAL FIELD

The present disclosure concerns a brake carrier for receiving brake pads for a disc brake with a brake disc, wherein the brake carrier has a clamping-side bridge strut on a clamping side of the disc brake, and a reaction-side bridge strut on a reaction side of the disc brake, arranged parallel to a brake carrier axis. The clamping-side bridge strut and the reaction-side bridge strut are connected together via a first connecting web at a first end of the brake carrier. Also, the clamping-side bridge strut and the reaction-side bridge strut are connected together via a second connecting web at a second end of the brake carrier. The brake carrier has a brake pad receiving side provided with brake carrier horns, and a brake carrier side oriented towards the road surface. The brake carrier side oriented towards the road surface is referred to below as the brake carrier underside.

BACKGROUND

In modern brake carriers, depending on the brake position, for example rain, snow, salt or other influences can easily penetrate between the friction faces of the brake disc and the brake pads. Thus a coefficient of friction can be negatively influenced and also a differential wear can be created or amplified. The coefficient of friction is the friction which occurs on contact of the brake pads with the brake disc. The differential wear is the wear between the brake pads and the brake disc. DE 43 43 737 A1 describes a brake carrier with integral periphery with four brake carrier horns which form two U-shaped shafts for receiving brake pads. The center struts of the brake carrier run in a straight line. No additional embodiment of the brake carrier is provided for dissipation of influences such as rain, snow, sand, salt etc.

DE 10 2016 104 967 A1 for example discloses a brake carrier with a special design. The brake carrier has two arcuate portions, wherein an underside of one arcuate portion oriented towards the road surface, or two undersides of the arcuate portions oriented towards the road surface, may be tilted at an angle of 1° to 20°. This dissipates stresses inside the brake carrier. The tilted arrangement is present only at stress-critical points of the brake carrier. There is no effective protection against influences such as snow, dirt or sand, since the undersides of the arcuate portions oriented towards the road surface do not enclose the rib portions of the brake carrier.

SUMMARY

The object of the invention is to provide a brake carrier with an improved coefficient of friction between the brake disc and the brake pad, which prevents or at least minimizes the differential wear.

The object is achieved in that the clamping-side bridge strut has a first chamfer on the brake carrier underside of the brake carrier oriented towards the road surface, and the first chamfer of the clamping-side bridge strut is arranged so as to be continuous starting from a first carrier brake horn to a second brake carrier horn, and the reaction-side bridge strut has a second chamfer on the brake carrier underside and the second chamfer of the reaction-side bridge strut is arranged so as to be continuous starting from a third brake carrier horn to a fourth brake carrier horn.

Since the brake carrier is designed open towards the road surface, during travel dirt, water, snow, salt, brake dust or sand can be deposited in the interior of the brake carrier between the brake disc and the brake pads. The dirt, rain, salt, brake dust or sand is referred to below as deposits, wherein the deposits listed are not conclusive. The chamfers of the brake carrier underside guide the deposits out of the interior of the brake carrier towards the outside in a targeted fashion. This prevents an accumulation of deposits in the interior of the brake carrier, and the coefficient of friction is not negatively influenced by the deposits. Also, a hardening of the deposits in the interior of the brake carrier is thus countered, which prevents or at least minimizes a differential wear.

In a further embodiment, the slope of the first chamfer of the clamping-side bridge strut rises relative to the direction of the brake carrier underside of the brake disc, and the slope of the second chamfer of the reaction-side bridge strut rises relative to the direction of the brake carrier underside of the brake disc.

The first chamfer of the clamping-side bridge strut and the first chamfer of the reaction-side bridge strut serve as a hopper which reduces in the direction towards the road surface. Thus deposits can only poorly penetrate into the interior of the brake carrier, and the targeted discharge of deposits from the brake carrier becomes easier.

In addition, in a further advantageous embodiment, the brake carrier has a virtual first plane "E" and a virtual second plane "E2". The first chamfer of the clamping-side bridge strut is tilted by an angle ($\alpha$) relative to the virtual first plane "E", and the second chamfer of the reaction-side bridge strut is tilted by an angle ($\beta$) relative to the second plane "E2".

It has also been found that, advantageously, the first chamfer of the clamping-side bridge strut is tilted at an angle ($\alpha$) between 1.5° and 15°, and the second chamfer of the reaction-side bridge strut is tilted at an angle ($\beta$) between 1.5° and 10°, which allows a particularly controlled and targeted discharge of deposits. Preferably, the first chamfer of the clamping-side bridge strut is tilted at an angle ($\alpha$) of 5°, and the second chamfer of the reaction-side bridge strut is tilted at an angle ($\beta$) of 3°.

In a further embodiment, the first chamfer of the clamping-side bridge strut has a lug parallel to the brake carrier axis, and/or the second chamfer of the reaction-side bridge strut has a lug parallel to the brake carrier axis. By means of the additional lug of the clamping-side bridge strut and/or the lug of the reaction-side bridge strut, deposits can be eliminated even more precisely and discharged from the interior of the brake carrier in a targeted fashion. Also, it is more difficult for deposits to penetrate into the brake caliper, whereby the coefficient of friction between the brake disc and the brake pads is improved.

In a further embodiment, the lug of the clamping-side bridge strut and/or the lug of the reaction-side bridge strut are advantageously formed integrally with the brake carrier. This means that the brake carrier is cast as one component with the lug of the clamping-side bridge strut and/or the lug of the reaction-side bridge strut. No additional working steps are necessary.

Furthermore, it is also conceivable that the first chamfer of the clamping-side bridge strut and the second chamfer of the reaction-side bridge strut are arranged so as to be continuous between the first connecting web and the second connecting web. Because of the continuous chamfers, an undesirable friction between the brake disc and the brake pads is reduced to a minimum or prevented completely. Also, the interior of the brake carrier is protected maximally against the accumuVlation of deposits, so that the differential wear is reduced as far as possible.

In a further advantageous embodiment, the first chamfer of the clamping-side bridge strut is arranged so as to be continuous starting from a third brake carrier horn to a fourth brake carrier horn, and the second chamfer of the reaction-side bridge strut is arranged so as to be continuous between the first connecting web and the second connecting web. According to a further embodiment, the first chamfer of the clamping-side bridge strut is arranged so as to be continuous between the first connecting web and the second connecting web. Also, the second chamfer of the reaction-side bridge strut is arranged so as to be continuous starting from a first brake carrier horn to a second brake carrier horn. It has been found that, advantageously, depending on the location of use of a vehicle, only the clamping-side bridge strut or the reaction-side bridge strut of the brake carrier need be arranged so as to be continuous between the first connecting web and the second connecting web in order to counter the accumulation of deposits. The majority of deposits settle between the brake pads and the brake disc. For vehicles which run mainly on hard road surfaces, a continuous arrangement of the first chamfer on the clamping-side bridge strut of the brake carrier, or on the reaction-side bridge strut between the first connecting web and the second connecting web of the brake carrier, is sufficient.

Selected exemplary embodiments of the invention are explained in more detail below with reference to the attached figures. The drawings are provided herewith for purely illustrative purposes and are not intended to limit the scope of the present invention.

DETAILED DESCRIPTION OF THE DRAWINGS

Figure 1:
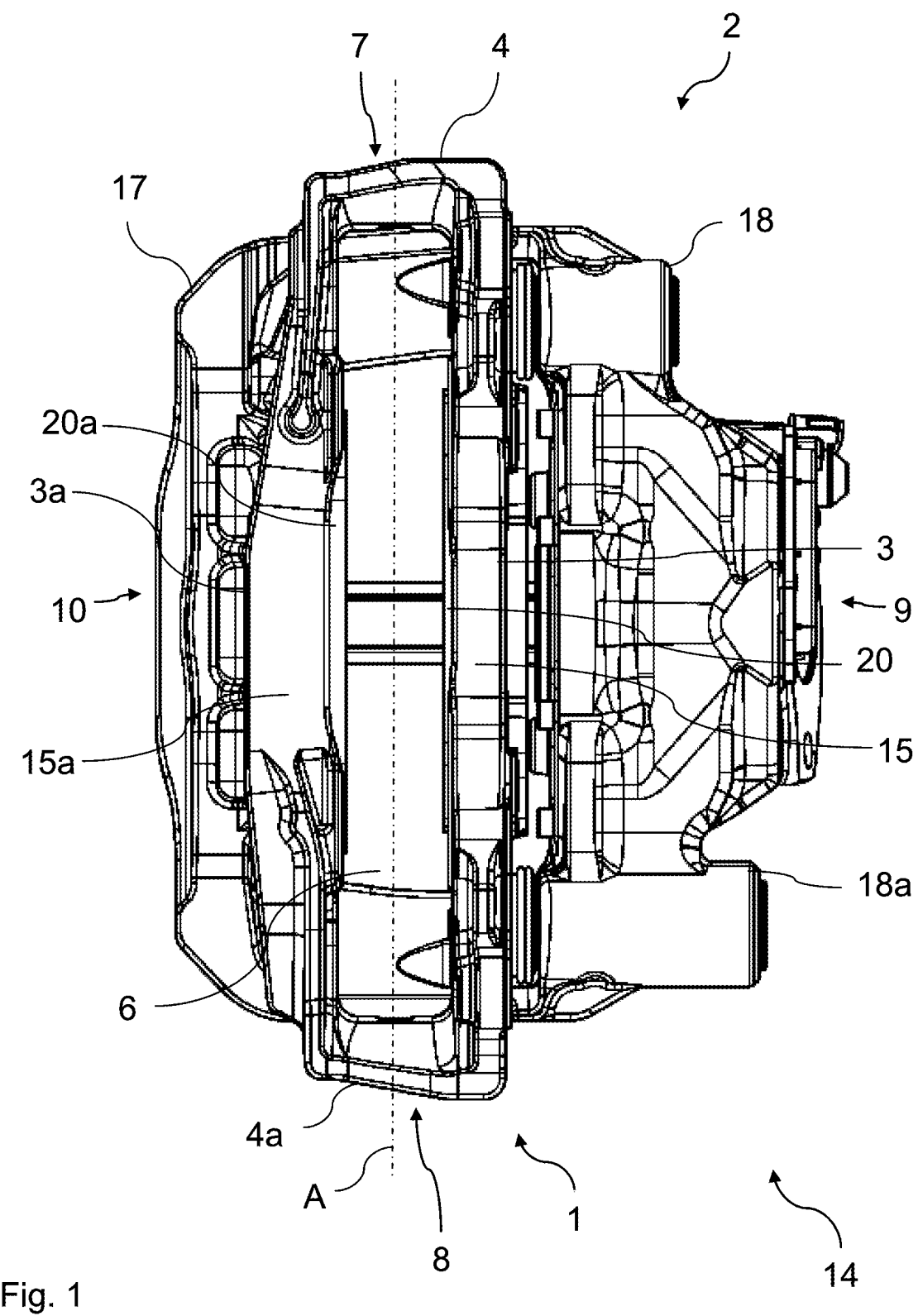
FIG. 1 shows a disc brake with a brake carrier in installed state, from the brake carrier underside.

FIG. 1 shows, from the brake carrier underside 14, a disc brake 2 with a brake disc 6 and two brake pads 20, 20*a* for braking the vehicle during travel. The disc brake 2 has a floating caliper 17 which is mounted floating on a brake carrier 1 via two sliding bolts 18, 18*a*. The brake disc 6 is arranged axially to a brake carrier axis A in the brake carrier 1. The brake carrier 1 has a clamping-side bridge strut 3 on a clamping side 9, and similarly a reaction-side bridge strut 3*a* on a reaction side 10.

A first connecting web 4 connects the clamping-side bridge strut 3 and the reaction-side bridge strut 3*a* at a first end 7 of the brake carrier 1. At an opposite second end 8 of the brake carrier 1, a second connecting web 4*a* connects the clamping-side bridge strut 3 and the reaction-side bridge strut 3*a* of the brake carrier 1. The clamping-side bridge strut 3 and the reaction-side bridge strut 3*a* each have a chamfer 15, 15*a* on the brake carrier underside 14. The first chamfer 15 of the clamping-side bridge strut 3 extends from a third brake carrier horn 12*b* to a fourth brake carrier horn 12*c* (FIG. 2*a*). The second chamfer 15*a* of the reaction-side bridge strut 3*a* extends from a first brake carrier horn 12 to a second brake carrier horn 12*a* (FIG. 2*a*).

During travel or when the vehicle has stopped, deposits are thus deflected directly at the first chamfer 15 of the clamping-side bridge strut 3 and at the second chamfer 15*a* of the reaction-side bridge strut 3*a*, and transported towards the outside away from the brake disc 6. Deposits generated by the disc brake 2 itself, such as brake dust or other deposits, cannot settle or can only settle to a limited extent between the brake disc 6 and the brake pads 20, 20*a*. This prevents or minimizes additional friction between the brake disc 6 and the brake pads 20, 20*a*. The process of braking the vehicle from travel to stationary is shortened due to the improved coefficient of friction between the brake disc 6 and the brake pads 20, 20*a*, and the vehicle comes to a stop sooner. The differential wear between the brake pads 20, 20*a* and the brake disc 6 is reduced. This means that deposits do not fill or do not completely fill an air gap, i.e. the distance between the brake disc 6 and the brake pads 20, 20*a*, so that when the vehicle is not braked, the air gap is retained. Additional wear of the brake pads 20, 20*a* in unbraked state of the vehicle is avoided or at least reduced.

Figure 2:
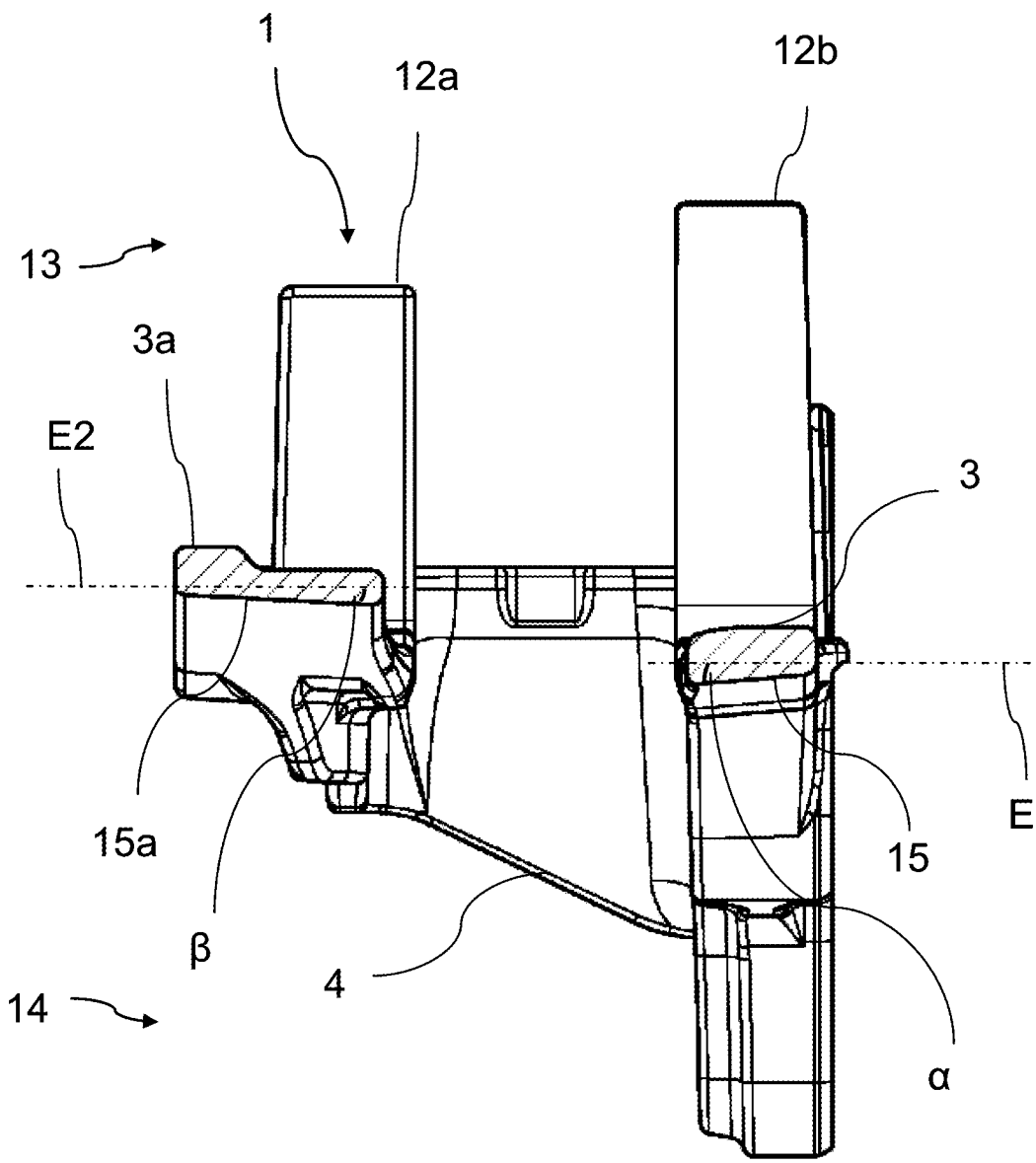
FIG. 2 shows a brake carrier according to FIG. 1, in cross-section.
Figure 2A:
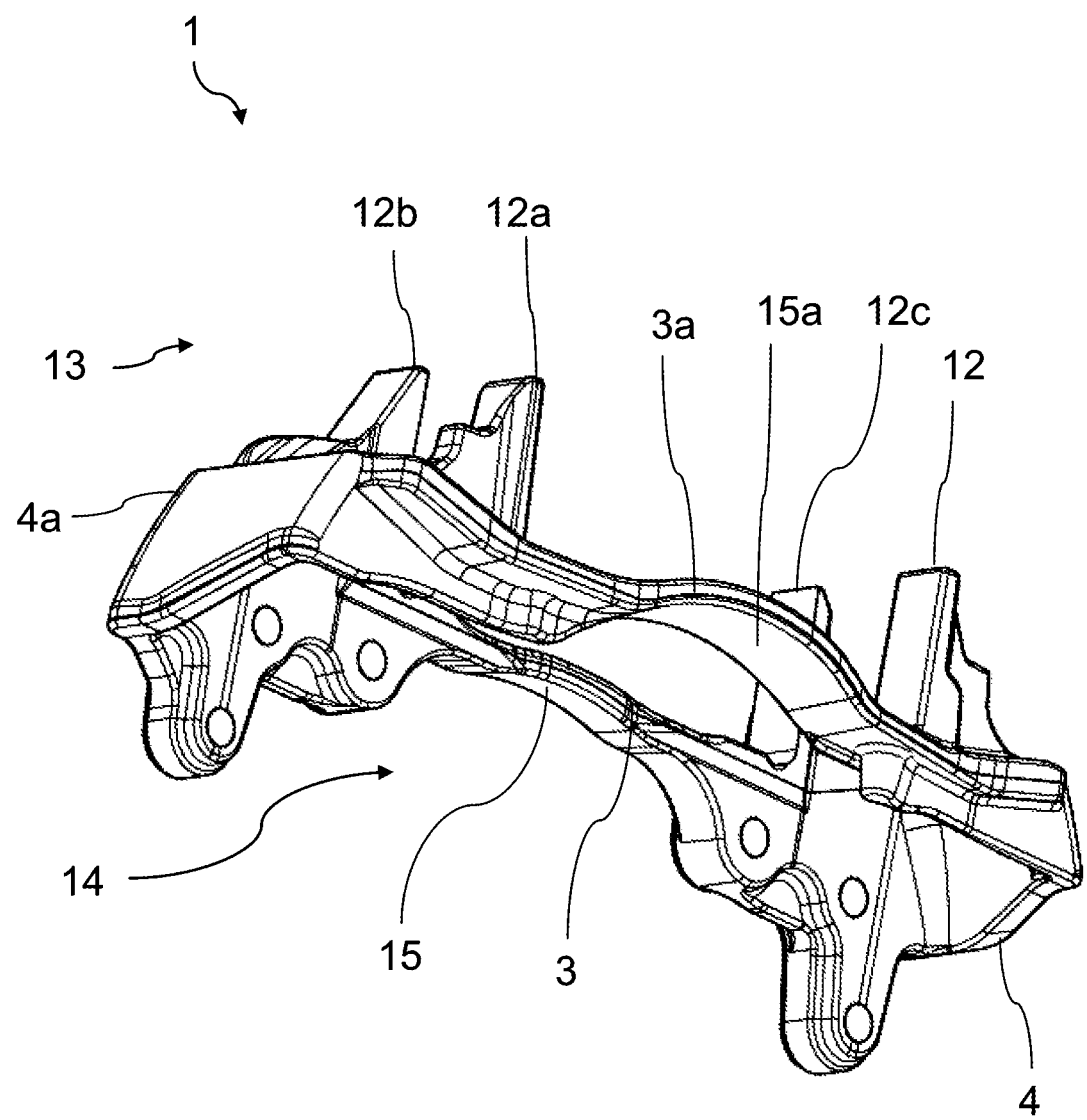
FIG. 2*a* shows a brake carrier according to FIG. 1, in a rotated side view.

FIG. 2 shows the brake carrier 1 from FIG. 1 in cross-section. The brake carrier 1 has a brake pad receiving side 13 and a side 14 facing away from the brake pad 20, 20*a*. The first chamfer 15 of the clamping-side bridge strut 3 and the second chamfer 15a of the reaction-side bridge strut 3a are clearly visible. The first chamfer 15 of the clamping-side bridge strut 3 is tilted at an angle α of 5° relative to a virtual first plane E, in the direction of the brake disc 6 (see FIG. 1) of the brake carrier 1. Similarly, on the opposite side, the reaction-side bridge strut 3a is tilted by an angle β of 3° relative to a virtual second plane E2, in the direction of the brake disc 6 (see FIG. 1) of the brake carrier 1.

FIG. 2a shows the brake carrier according to FIG. 1 and FIG. 2 in a rotated view from the side. FIG. 2a in particular shows the arrangement of the first chamfer 15 of the clamping-side bridge strut 3 and the second chamfer 15a of the reaction-side bridge strut 3a on the side 14 of the brake carrier 1 facing away from the brake pad 20, 20a. Furthermore, the brake carrier horns 12, 12a, 12b, 12c for receiving the brake pads 20, 20a (see FIG. 1) of the brake carrier 1 are visible on the brake pad receiving side 13.

Figure 2B:
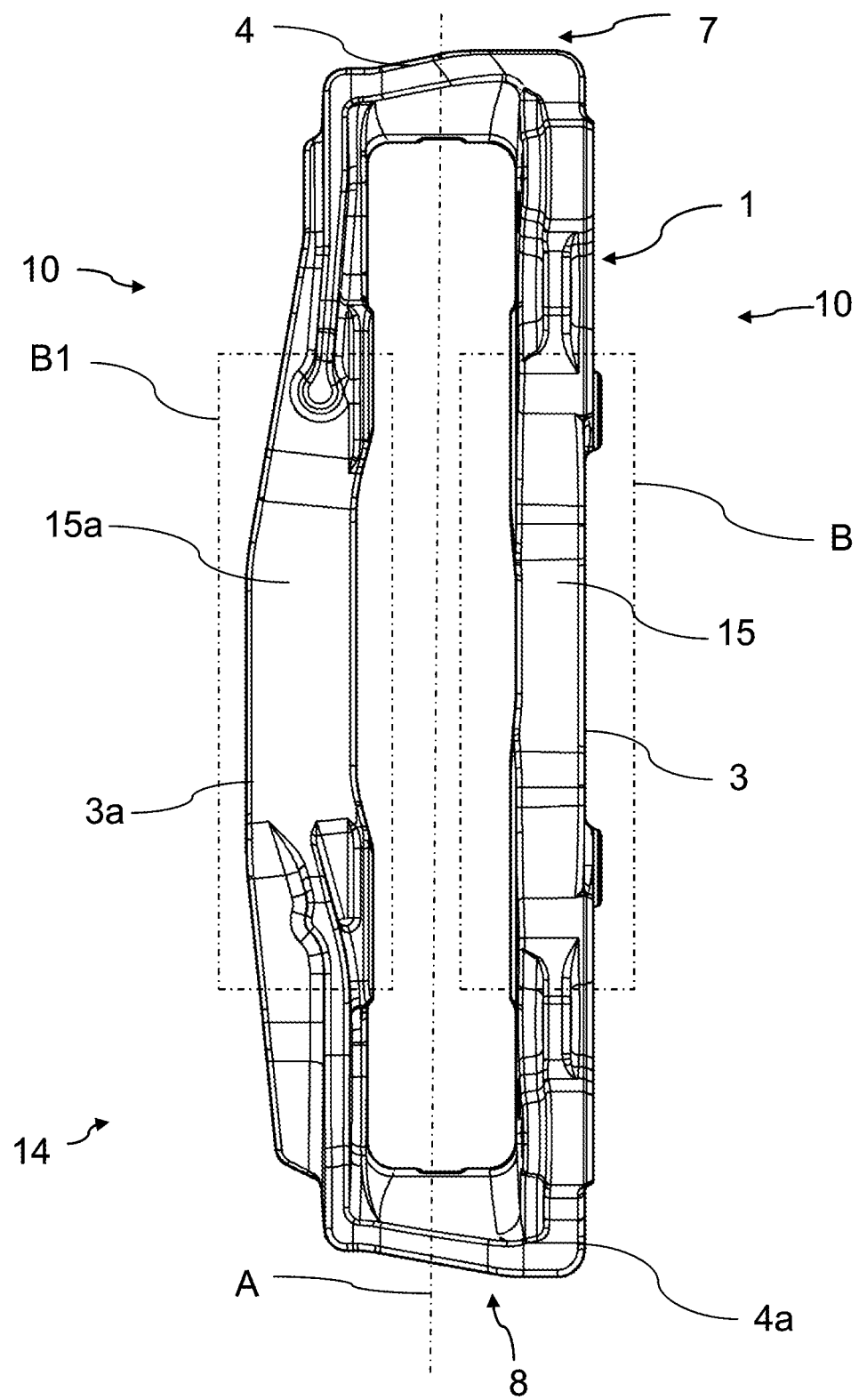
FIG. 2*b* shows a brake carrier according to FIG. 1 in removed state, from the brake carrier underside.

FIG. 2b shows the brake carrier 1 from FIGS. 1 to 2a from the brake carrier underside 14 but in removed state. In addition, on the clamping-side bridge strut 3, a virtual region B of the first chamfer 15, and on the reaction-side bridge strut 3a a virtual region B1 of the second chamfer 15a are marked. The regions B, B1 illustrate the arrangement of the chamfers 15, 15a on the bridge struts 3, 3a. The first chamfer 15 of the clamping-side bridge strut 3 extends from a third brake carrier horn 12b to a fourth brake carrier horn 12c. The second chamfer 15a of the reaction-side bridge strut 3a extends from a first brake carrier horn 12 to a second brake carrier horn 12a.

Figure 3:
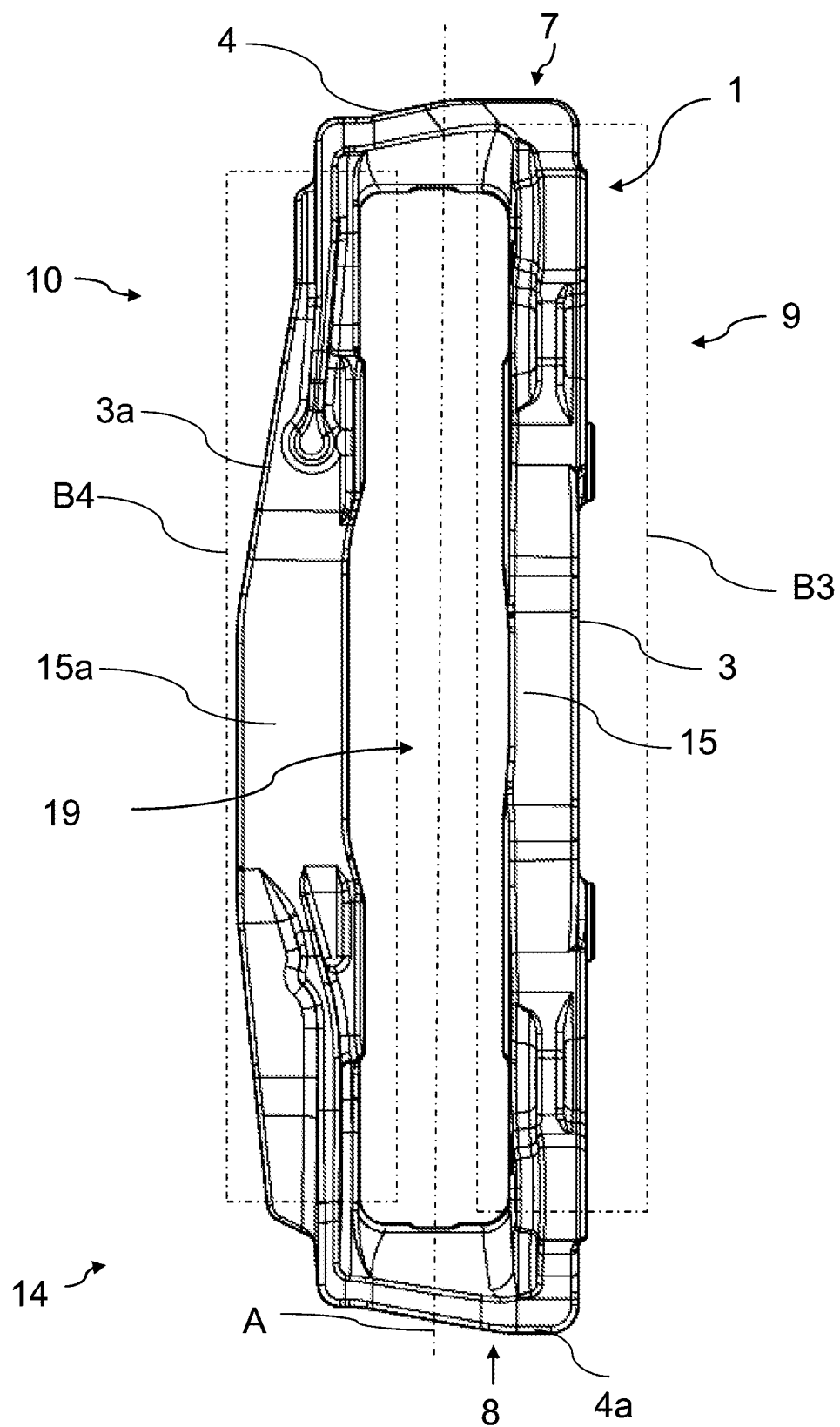
FIG. 3 shows a brake carrier according to FIG. 1, from the underside of the brake carrier, wherein the first chamfer of the clamping-side bridge strut and the second chamfer of the reaction-side bridge strut are arranged so as to be continuous from a first connecting web of the brake carrier to a second connecting web of the brake carrier.

FIG. 3 shows a brake carrier 1 from FIGS. 1 to 2b, in which the first chamfer 15 of the clamping-side bridge strut 3 and the second chamfer 15a of the reaction-side bridge strut 3a are arranged between the first connecting web 4 and the second connecting web 4a. The arrangement of the first chamfer 15 of the clamping-side bridge strut 3 is marked by a virtual region B3 for clarification. The arrangement of the second chamfer 15a of the reaction-side bridge strut 3 is marked by a virtual region B4 for clarification. The chamfers 15, 15a are arranged on the brake carrier underside 14 of the bridge struts 3, 3a of the brake carrier 1, and hinder the penetration of deposits into an interior 19 of the brake carrier 1.

In addition, compared with arrangement of the first chamfer 15 of the clamping-side bridge strut 3 from a third brake carrier horn 12b to a fourth brake carrier horn 12c, and the arrangement of the second chamfer 15a of the reaction-side bridge strut 3a from a first brake carrier horn 12 to a second brake carrier horn 12a, the coefficient of friction is improved and the differential wear between the brake disc 6 and the brake pads 20, 20a is reduced (cf. FIG. 1). The first chamfer 15 of the clamping-side bridge strut 3 is namely arranged parallel to the brake carrier axis A over the entire length of the clamping-side bridge strut 3. Also, the second chamfer 15a of the reaction-side bridge strut 3a is arranged parallel to the brake carrier axis A over the entire length of the reaction-side bridge strut 3a.

Figure 4:
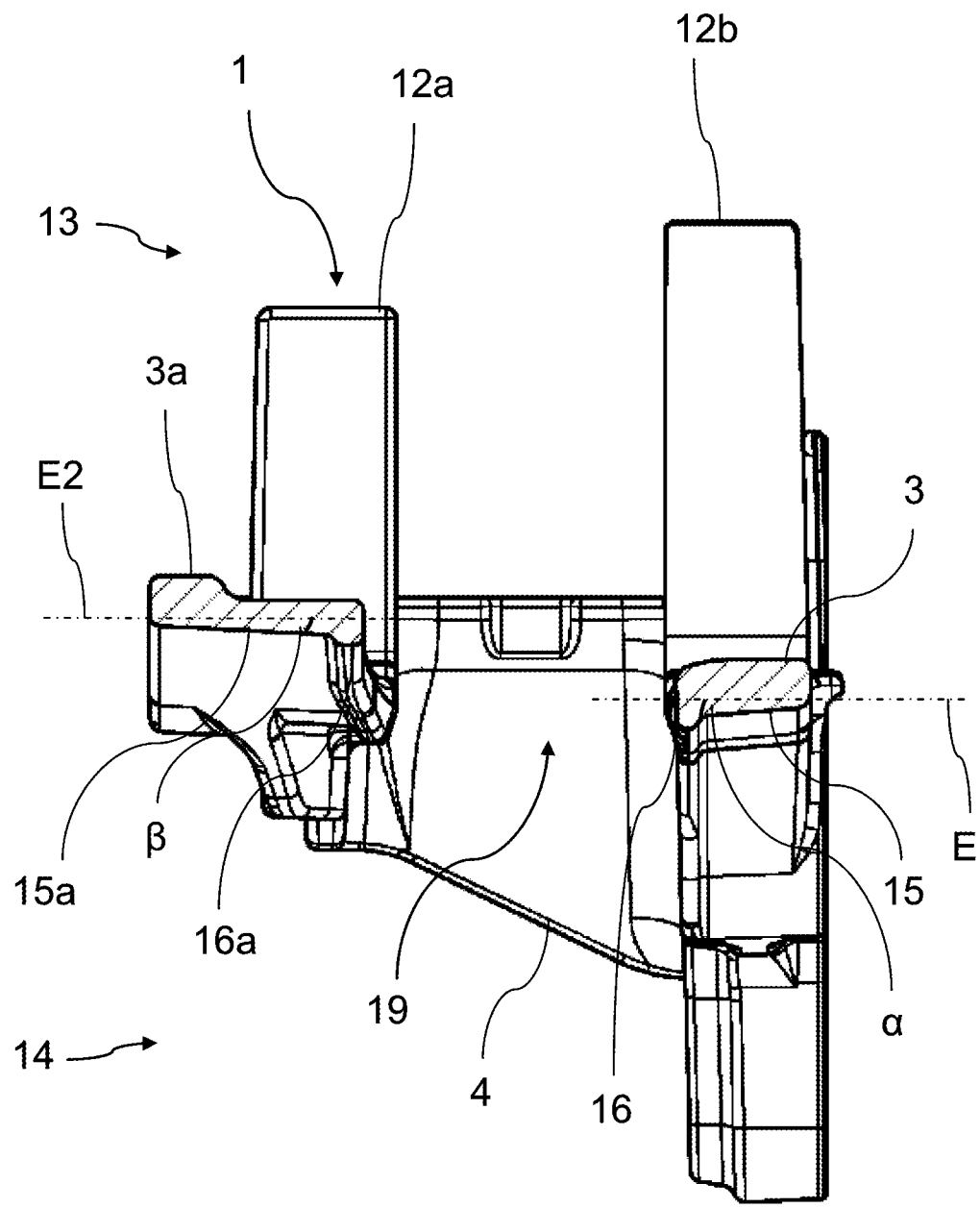
FIG. 4 shows a brake carrier in cross-section, wherein the first chamfer of the clamping-side bridge strut and the second chamfer of the reaction-side bridge strut each comprise a lug.

FIG. 4 shows a third variant of the brake carrier 1. FIG. 4 shows in cross-section the brake carrier 1 with a first connecting web 4. The first chamfer 15 of the clamping-side bridge strut 3 is tilted at an angle α of 5° relative to a virtual first plane E, in the direction of the brake disc 6 (see FIG. 1) of the brake carrier 1. Similarly, on the opposite side, the reaction-side bridge strut 3a is tilted at an angle β of 3° relative to a virtual second plane E2, in the direction of the brake disc 6 (see FIG. 1) of the brake carrier 1.

In addition, the first chamfer 15 of the clamping-side bridge strut 3 has a first lug 16. A second lug 16a is arranged on the second chamfer 15a of the reaction-side bridge strut 3a. The first lug 16 of the first chamfer 15 of the clamping-side bridge strut 3 is arranged in the direction of the brake carrier underside 14, relative to a virtual first plane E. The second lug 16a of the second chamfer 15a of the reaction-side bridge strut 3a is also arranged in the direction of the brake carrier underside 14, relative to a virtual second plane E2. The lugs 16, 16a constitute an additional barrier so that deposits which could penetrate into the interior 19 of the brake carrier 1 from the outside rebound on the lugs 16, 16a and are conducted away from the brake disc 6 along the chamfers 15, 15a.

Figure 5:
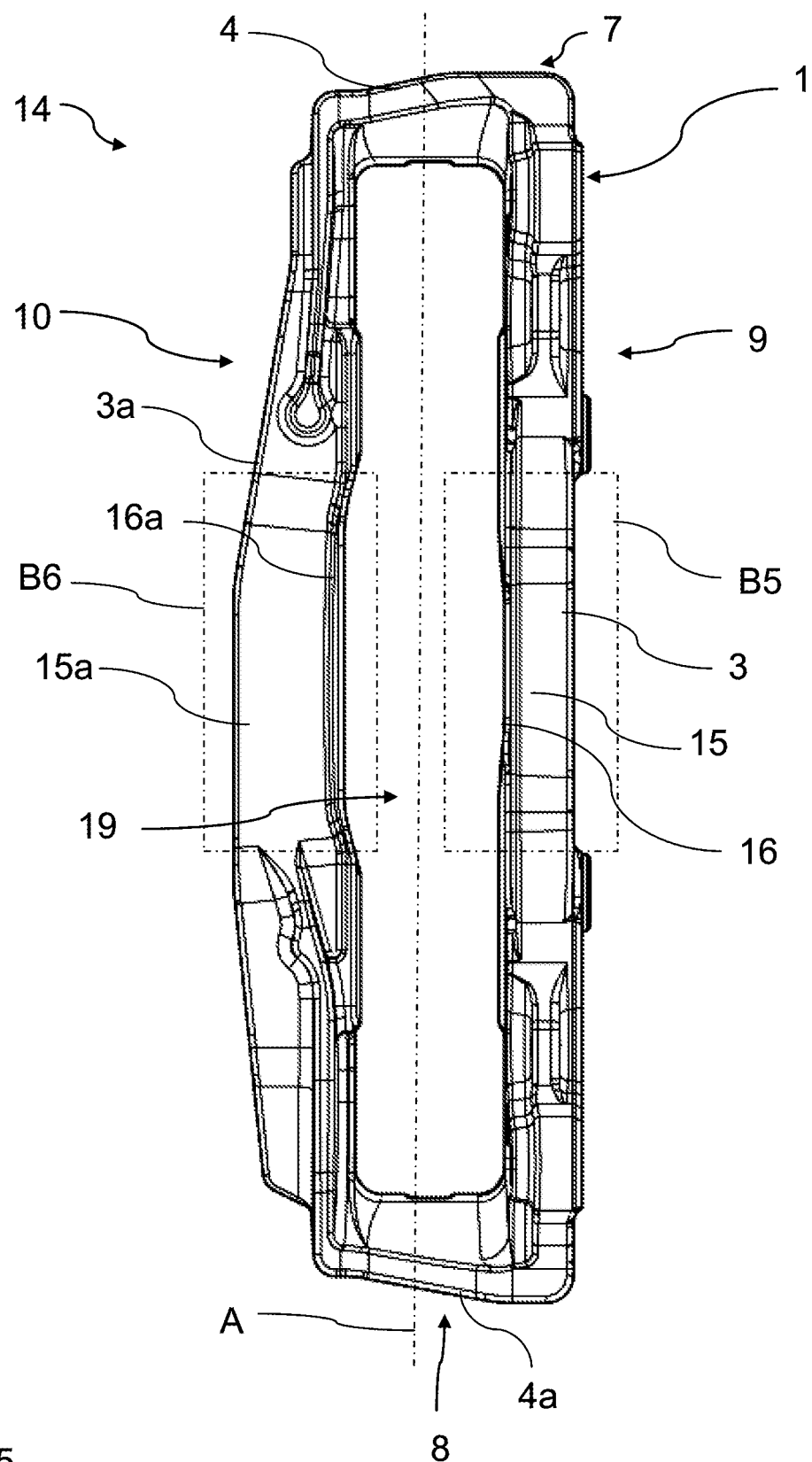
FIG. 5 shows a brake carrier according to FIG. 4, from the brake carrier underside.

FIG. 5 shows the brake carrier 1 according to FIG. 4 from the brake carrier underside 14. In particular, this shows the continuous arrangement of the first lug 16 of the first chamfer 15 of the clamping-side bridge strut, and the continuous arrangement of the second lug 16a of the second chamfer 15a of the reaction-side bridge strut 3a, which are parallel in the direction of the brake carrier axis A. The first lug 16 of the first chamfer 15 of the clamping-side bridge strut 3 extends from the third brake carrier horn 12b to the fourth brake carrier horn 12c (FIG. 2a). The second lug 16a of the second chamfer 15a of the reaction-side bridge strut 3a extends from the first brake carrier horn 12 to the second brake carrier horn 12a (see FIG. 2a). For clarification, the region of the first lug 16 of the first chamfer 15 of the clamping-side bridge strut 3 is indicated by virtual region B5, and the second lug 16a of the second chamfer 15a of the reaction-side bridge strut is indicated by a virtual region B6.

Figure 6:
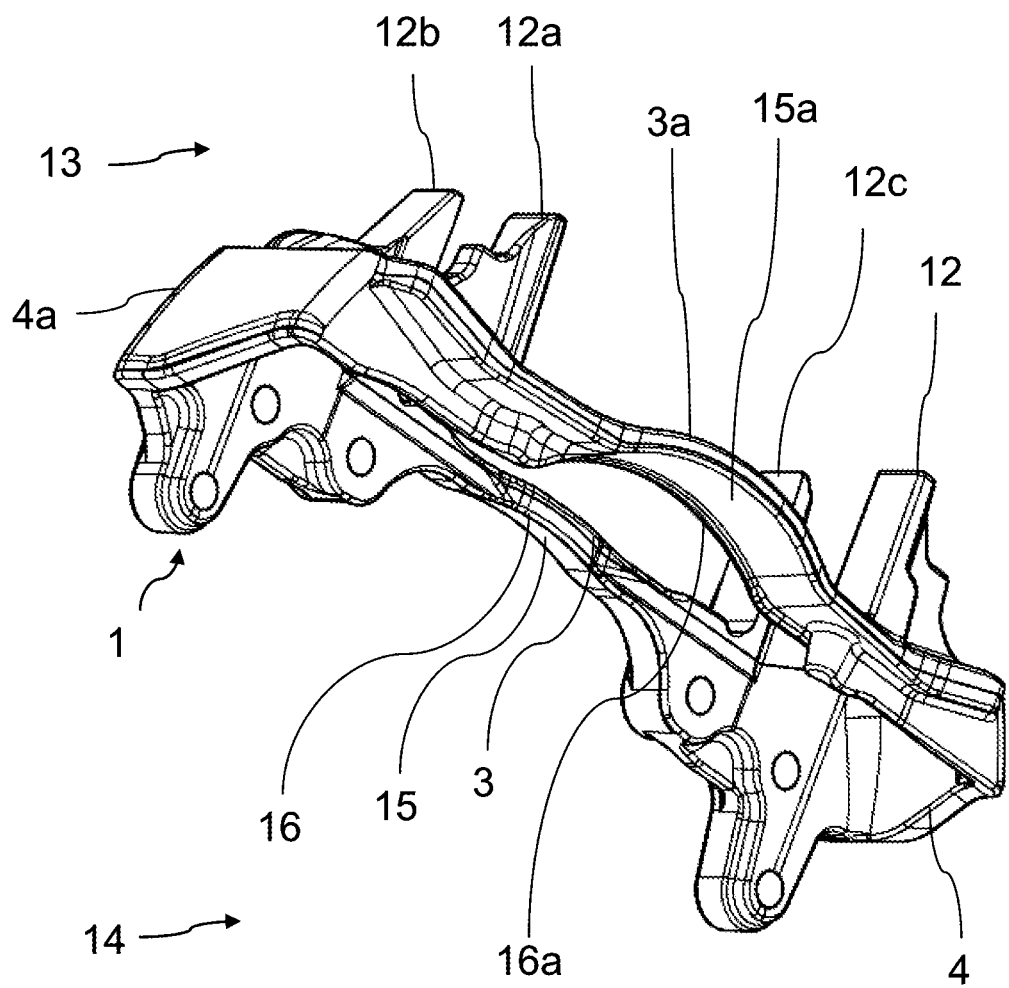
FIG. 6 shows a brake carrier according to FIG. 4, in a rotated perspective view from the side.

FIG. 6 shows the brake carrier 1 according to FIG. 4 in a rotated perspective view from the side. In particular, this shows the continuously arranged first lug 16 of the first chamfer 15 of the clamping-side bridge strut 3, which extends from the third brake carrier horn 12b to the fourth brake carrier horn 12c. Furthermore, the continuously arranged second lug 16a of the second chamfer 15a of the reaction-side bridge strut 3a is visible, which extends from the first brake carrier horn 12 to the second brake carrier horn 12a.

Figure 7:
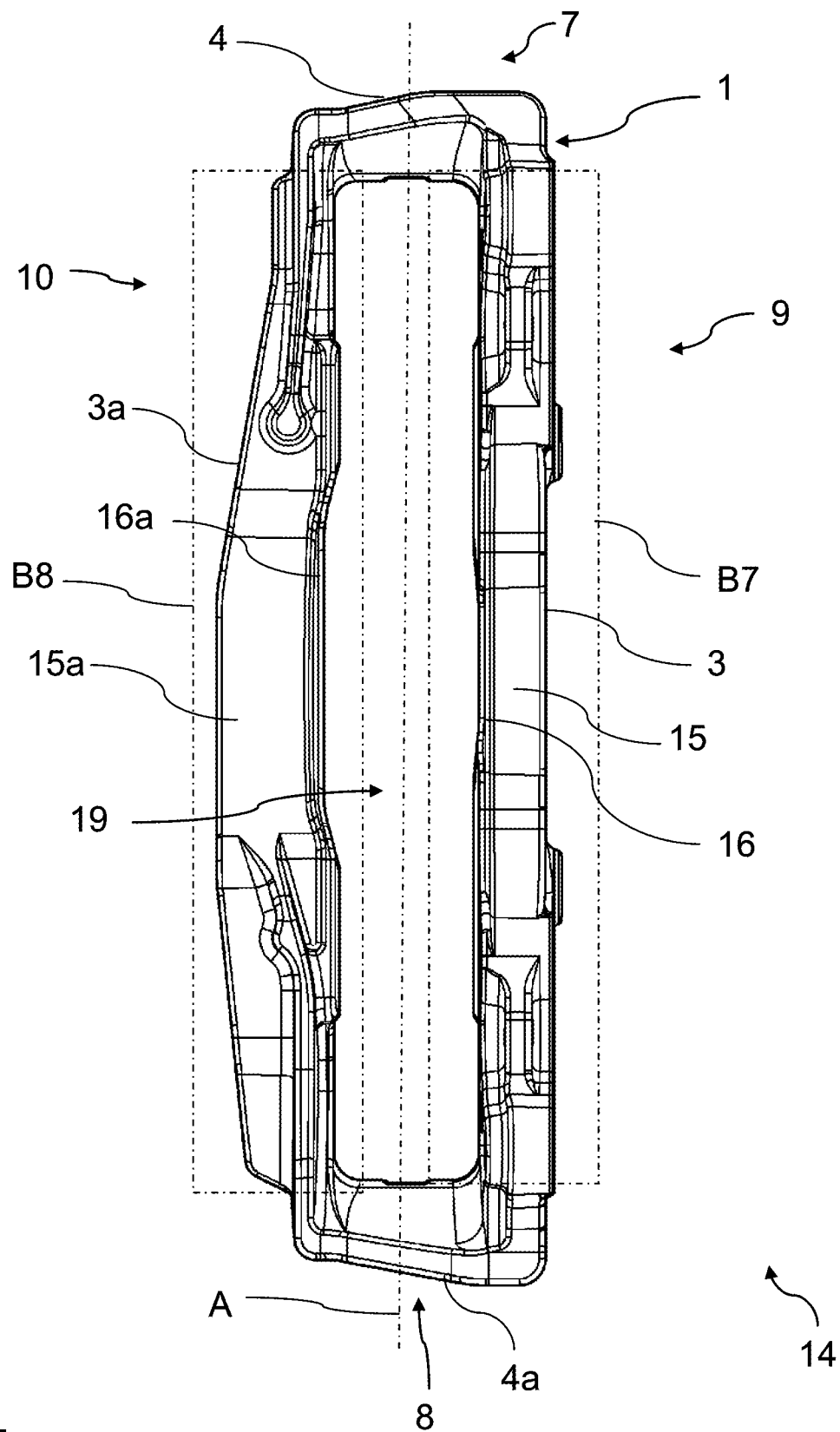
FIG. 7 shows a brake carrier according to FIG. 4, from the brake carrier underside, wherein the lug of the first chamfer of the clamping-side bridge strut and the lug of the second chamfer of the reaction-side bridge strut are arranged so as to be continuous from a first connecting web of the brake carrier to a second connecting web of the brake carrier.

FIG. 7 shows the region of the chamfers 15, 15a of the brake carrier 1 according to FIG. 6 from the brake carrier underside 14. In FIG. 7, the first lug 16 of the first chamfer 15 of the clamping-side bridge strut 3, and the second lug 16a of the second chamfer 15a of the reaction-side bridge strut 3a, are arranged continuously and without interruption between the first connecting web 4 and the second connecting web 4a. For clarification, the region of the first lug 16 of the first chamfer 15 of the clamping-side bridge strut 3 is indicated by a virtual region B7, and that of the lug 16a of the second chamfer 15a of the reaction-side bridge strut 3a is indicated by a virtual region B8.

Figure 8:
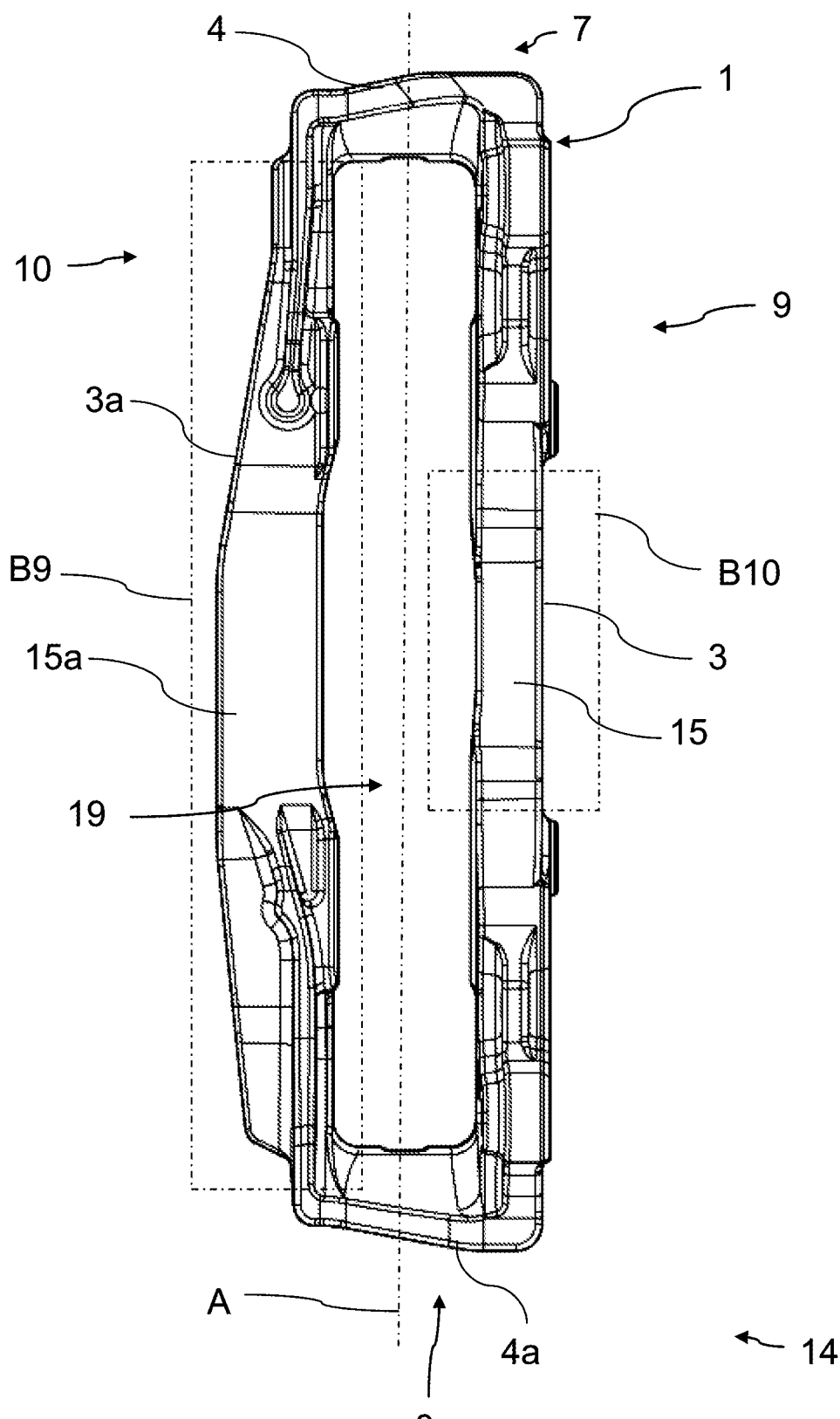
FIG. 8 shows a brake carrier, from the brake carrier underside, wherein the reaction-side bridge strut is arranged so as to be continuous from a first connecting web of the brake carrier to a second connecting web of the brake carrier, and the clamping-side bridge strut is arranged so as to be continuous from a first brake carrier horn to a second brake carrier horn.

FIG. 8 shows a further exemplary embodiment of the brake carrier 1 from FIG. 6. In FIG. 8, the second chamfer 15a of the reaction-side bridge strut 3a is arranged so as to be continuous from a first connecting web 4 of the brake carrier 1 to a second connecting web 4a of the brake carrier 1. Also, the clamping-side bridge strut 3 is arranged so as to be continuous from a third brake carrier horn 12b to a fourth brake carrier horn 12c. A virtual region B9 indicates the second chamfer 15a of the reaction-side bridge strut 3a. The first chamfer 15 of the clamping-side bridge strut 3 is illustrated by a virtual region B10.

Figure 9:
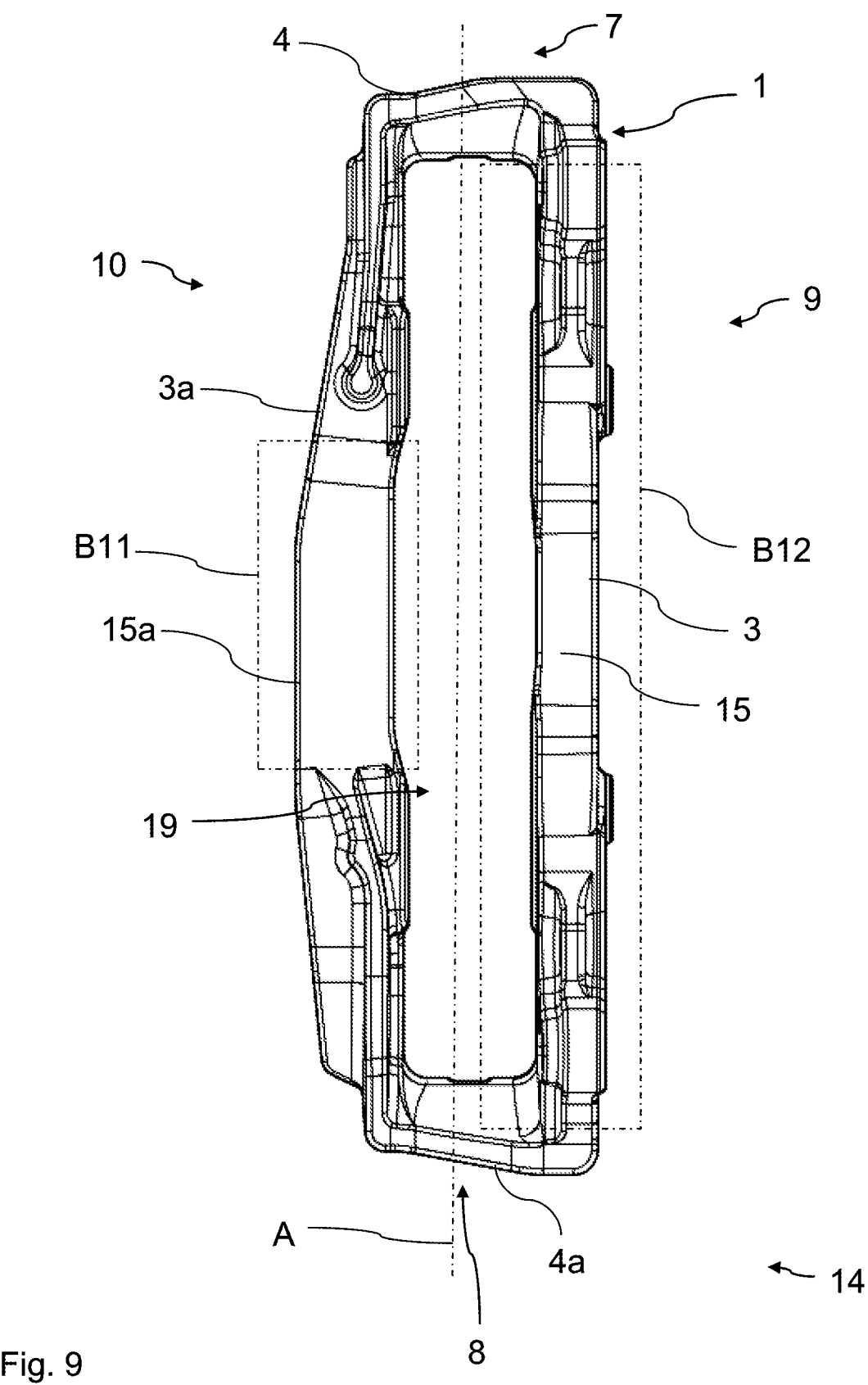
FIG. 9 shows a brake carrier, from the brake carrier underside, wherein the clamping-side bridge strut is arranged so as to be continuous from a first connecting web of the brake carrier to a second connecting web of the brake carrier, and the reaction-side bridge strut is arranged so as to be continuous from a third brake carrier horn to a fourth brake carrier horn.

FIG. 9 shows in contrast a brake carrier 1 according to FIG. 6, wherein the first chamfer 15 of the clamping-side bridge strut 3 is arranged so as to be continuous from a first connecting web 4 of the brake carrier 1 to a second connecting web 4a of the brake carrier 1, and the second chamfer 15a of the reaction-side bridge strut 3a is arranged so as to be continuous from a first brake carrier horn 12 to a second brake carrier horn 12a. A virtual region B11 indicates the second chamfer 15a of the reaction-side bridge strut 3a. The first chamfer 15 of the clamping-side bridge strut 3 is illustrated by a virtual region B12.

Figure 10:
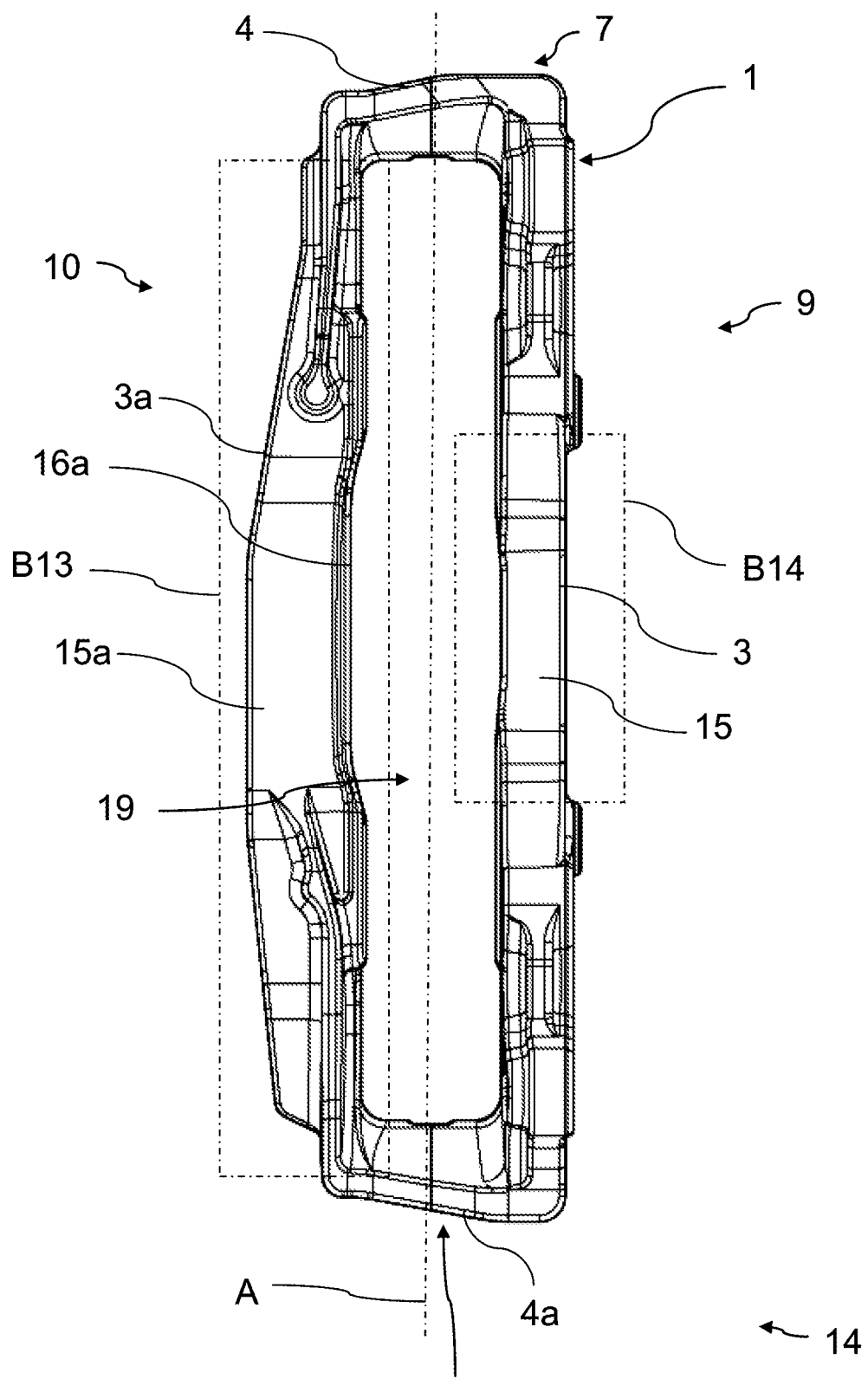
FIG. 10 shows a brake carrier, from the brake carrier underside, wherein the clamping-side bridge strut and the reaction-side bridge strut each comprise a chamfer, and the reaction-side bridge strut also comprises a lug.

FIG. 10 shows a further embodiment of the brake carrier 1 according to FIG. 6. According to FIG. 10, the clamping-side bridge strut 3 of the brake carrier 1 has a first chamfer 15, and the reaction-side bridge strut 3a of the brake carrier 1 has a second chamfer 15a. In addition, a second lug 16a is arranged on the reaction-side bridge strut 3a. A virtual region B13 indicates the arrangement of the second chamfer 15a of the reaction-side bridge strut 3a. The second chamfer 15a and the second lug 16a of the reaction-side bridge strut 3a are arranged so as to be continuous from a first connecting web 4 of the brake carrier 1 to a second connecting web 4a of the brake carrier 1. The first chamfer 15 of the clamping-side bridge strut 3 is arranged so as to be continuous from a third brake carrier horn 12b of the brake carrier 1 to a fourth brake carrier horn 12c of the brake carrier 1. The first chamfer 15 of the clamping-side bridge strut 3 is indicated by a virtual region B14.

Figure 11:
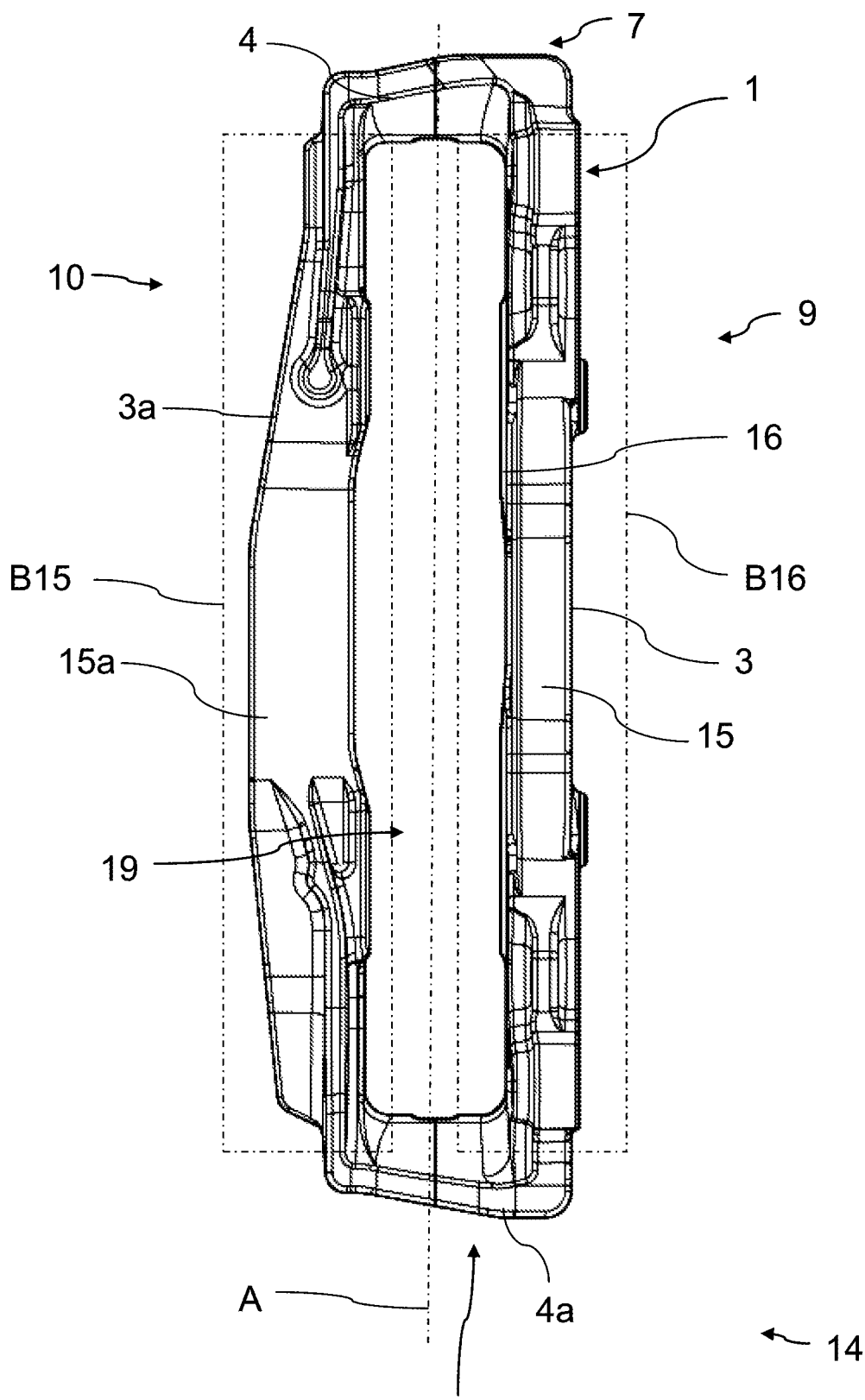
FIG. 11 shows a brake carrier, from the brake carrier underside, wherein the clamping-side bridge strut and the reaction-side bridge strut each comprise a chamfer, and the clamping-side bridge strut also comprises a lug.

FIG. 11 shows a brake carrier 1 according to FIG. 6 in which the clamping-side bridge strut 3 has a first chamfer 15 and the reaction-side bridge strut 3a has a second chamfer 15a. Furthermore, a first lug 16 is arranged on the clamping-side bridge strut 3. Both the first chamfer 15 of the clamping-side bridge strut 3 with the first lug 16, and the second chamfer 15a of the reaction-side bridge strut 3a, are arranged so as to be continuous from a first connecting web 4 of the brake carrier 1 to a second connecting web 4a of the brake carrier 1. A virtual region B15 indicates a second chamfer 15a of the reaction-side bridge strut 3a. The first chamfer 15 of the clamping-side bridge strut 3 with the first lug 16 is illustrated by a virtual region B16. The virtual region B15 shows the second chamfer 15a of the reaction-side bridge strut 3a.

While the above description constitutes the preferred embodiments of the present invention, it will be appreciated that the invention is susceptible to modification, variation and change without departing from the proper scope and fair meaning of the accompanying claims.

LIST OF REFERENCE SIGNS AS PART OF DESCRIPTION

1 Brake carrier
2 Disc brake
3 Clamping-side bridge strut
3a Reaction-side bridge strut
4 First connecting web
4a Second connecting web
6 Brake disc
7 First end of brake carrier 1
8 Second end of brake carrier 1
9 Clamping side
10 Reaction side
12 First brake carrier horn
12a Second brake carrier horn
12b Third brake carrier horn
12c Fourth brake carrier horn
13 Brake pad receiving side
14 Brake carrier underside
15 First chamfer of clamping-side bridge strut 3
15a Second chamfer of reaction-side bridge strut 3a
16 First lug of first chamfer 15
16a Second lug of second chamfer 15a
17 Floating caliper
18, 18a Slide bolts
19 Interior of brake carrier 1
20, 20a Brake pads
A Brake carrier axis
B-B16 Virtual regions of chamfers 15, 15a
E, E2 Planes of brake carrier 1
α, β Angles

The invention claimed is:

1. A brake carrier (1) for a disc brake (2) with a brake disc (6), the brake carrier comprising:
  a clamping-side bridge strut (3) on a clamping side (9) of the disc brake (2) and a reaction-side bridge strut (3a) on a reaction side (10) of the disc brake (2) arranged parallel to a brake carrier axis (A),
  wherein the clamping-side bridge strut (3) and the reaction-side bridge strut (3a) are connected together via a first connecting web (4) at a first end (7) of the brake carrier (1), and the clamping-side bridge strut (3) and the reaction-side bridge strut (3a) are connected together via a second connecting web (4a) at a second end (8) of the brake carrier (1),
  the brake carrier (1) further comprising a brake pad receiving side (13) including a first brake carrier horn (12), a second brake carrier horn (12a), a third brake carrier horn (12b), and a fourth brake carrier horn (12c), and including a brake carrier underside (14) opposite the brake pad receiving side (13),
  wherein the clamping-side bridge strut (3) has a first chamfer (15) on the brake carrier underside (14) of the brake carrier (1) and the first chamfer (15) of the clamping-side bridge strut (3) is arranged so as to be continuous starting from the third brake carrier horn (12b) to the fourth brake carrier horn (12c) and extending fully along the clamping side bridge strut (3) between the third brake carrier horn (12b) to the fourth brake carrier horn (12c), and
  wherein the reaction-side bridge strut (3a) has a second chamfer (15a) on the brake carrier underside (14) of the brake carrier (1) and the second chamfer (15a) of the reaction-side bridge strut (3a) is arranged so as to be continuous starting from the first brake carrier horn (12) to the second brake carrier horn (12a) and extending fully along the reaction side bridge strut (3a) between the first brake carrier horn (12) and the second brake carrier horn (12a);
  wherein the first chamfer (15) of the clamping-side bridge strut (3) is tilted by a first angle (α) and the second chamfer (15a) of the reaction-side bridge strut (3a) is tilted by a second angle (β);
  wherein the first angle and the second angle are angled at different degrees;
  wherein the brake carrier (1) has a virtual first plane (E) and a virtual second plane (E2), and the first chamfer (15) of the clamping-side bridge strut (3) is tilted by the first angle (α) relative to the first plane (E), and the second chamfer (15a) of the reaction-side bridge strut (3a) is tilted by the second angle (β) relative to the second plane (E2);
  wherein the first chamfer (15) of the clamping-side bridge strut (3) is tilted by the first angle (α) between 1.5° and 15° and the second chamfer (15a) of the reaction-side bridge strut (3a) is tilted by the second angle (β) between 1.5° and 10°, wherein the first angle is greater than the second angle;

wherein the clamping side bridge strut is arched and defines a clamping side strut apex with an upper surface and a lower surface thereof and the reaction side bridge strut is arched and defines a reaction side strut apex with an upper surface and a lower surface thereof, wherein the upper surface of the clamping side apex is disposed below the lower surface of the reaction side apex.

2. The brake carrier (1) for a disc brake (2) as claimed in claim 1, wherein the first chamfer (15) of the clamping-side bridge strut (3) has a first slope and the second chamfer (15a) of the reaction-side bridge strut (3a) has a second slope, the first and second slopes rising relative to the underside (14) in a direction facing away from a respective brake pad (20, 20a) disposed on opposite sides of the brake disc (6).

3. The brake carrier (1) for a disc brake (2) as claimed in claim 1, wherein the first chamfer (15) of the clamping-side bridge strut (3) has a first lug (16) parallel to the brake carrier axis (A), and the second chamfer (15a) of the reaction-side bridge strut (3a) has a second lug (16a) parallel to the brake carrier axis (A).

4. The brake carrier (1) for a disc brake (2) as claimed in claim 3, wherein the first lug (16) of the clamping-side bridge strut (3) is formed integrally with the brake carrier (1), and the second lug (16a) of the reaction-side bridge strut (3a) is formed integrally with the brake carrier (1).

5. The brake carrier (1) for a disc brake (2) as claimed in claim 1, wherein the first chamfer (15) of the clamping-side bridge strut (3) and the second chamfer (15a) of the reaction-side bridge strut (3a) are arranged so as to be continuous between the first connecting web (4) and the second connecting web (4a) and extending fully therebetween.

6. The brake carrier (1) for a disc brake (2) as claimed in claim 1, wherein the first chamfer (15) of the clamping-side bridge strut (3) is arranged so as to be continuous starting from the third brake carrier horn (12b) to the fourth brake carrier horn (12c) and extending fully therebetween, and the second chamfer (15a) of the reaction-side bridge strut (3a) is arranged so as to be continuous between the first connecting web (4) and the second connecting web (4a) and extending fully therebetween.

7. The brake carrier (1) for a disc brake (2) as claimed in claim 1, wherein the first chamfer (15) of the clamping-side bridge strut (3) is arranged so as to be continuous between the first connecting web (4) and the second connecting web (4a) and extending fully therebetween, and the second chamfer (15a) of the reaction-side bridge strut (3a) is arranged so as to be continuous starting from the first brake carrier horn (12) to the second brake carrier horn (12a) and extending fully therebetween.

8. A brake carrier (1) for a disc brake (2) with a brake disc (6), the brake carrier comprising:
 a clamping-side bridge strut (3) on a clamping side (9) of the disc brake (2) and a reaction-side bridge strut (3a) on a reaction side (10) of the disc brake (2) arranged parallel to a brake carrier axis (A),
 wherein the clamping-side bridge strut (3) and the reaction-side bridge strut (3a) are connected together via a first connecting web (4) at a first end (7) of the brake carrier (1), and the clamping-side bridge strut (3) and the reaction-side bridge strut (3a) are connected together via a second connecting web (4a) at a second end (8) of the brake carrier (1),
 the brake carrier (1) further comprising a brake pad receiving side (13) including a first brake carrier horn (12), a second brake carrier horn (12a), a third brake carrier horn (12b), and a fourth brake carrier horn (12c), and including a brake carrier underside (14) opposite the brake pad receiving side (13),
 wherein the clamping-side bridge strut (3) has a first bottom inclined surface (15) on the brake carrier underside (14) of the brake carrier (1) and the first bottom inclined surface (15) of the clamping-side bridge strut (3) is arranged so as to be continuous starting from the third carrier brake horn (12b) to the fourth brake carrier horn (12c),
 wherein the reaction-side bridge strut (3a) has a second bottom inclined surface (15a) on the brake carrier underside (14) of the brake carrier (1) and the second bottom inclined surface (15a) of the reaction-side bridge strut (3a) is arranged so as to be continuous starting from the first brake carrier horn (12) to the second brake carrier horn (12a);
 wherein the first bottom inclined surface (15) of the clamping-side bridge strut (3) has a first lug (16) parallel to the brake carrier axis (A), and the second bottom inclined surface (15a) of the reaction-side bridge strut (3a) has a second lug (16a) parallel to the brake carrier axis (A); and
 wherein the first lug projects downwardly relative to the first bottom inclined surface and the second lug projects downwardly relative to the second bottom inclined surface.

\* \* \* \* \*